US012228088B2

(12) United States Patent
Beyerer et al.

(10) Patent No.: US 12,228,088 B2
(45) Date of Patent: Feb. 18, 2025

(54) CONTROLLER WITH A LEARNING CAPABILITY AND AUTOMATIC EXPLORATION FUNCTION OF AN OPERATING PARAMETER SPACE

(71) Applicant: FRAUNHOFER-GESELLSCHAFT ZUR FÖRDERUNG DER ANGEWANDTEN FORSCHUNG E.V., Munich (DE)

(72) Inventors: Jürgen Beyerer, Karlsruhe (DE); Janina Stompe, Karlsruhe (DE); Julius Pfrommer, Karlsruhe (DE); Johannes Sailer, Karlsruhe (DE); Christian Frey, Karlsruhe (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/252,123

(22) PCT Filed: Nov. 9, 2021

(86) PCT No.: PCT/EP2021/081083
§ 371 (c)(1),
(2) Date: May 8, 2023

(87) PCT Pub. No.: WO2022/101185
PCT Pub. Date: May 19, 2022

(65) Prior Publication Data

US 2023/0407805 A1 Dec. 21, 2023

(30) Foreign Application Priority Data

Nov. 12, 2020 (DE) ..................... 10 2020 129 873.0

(51) Int. Cl.
*F02D 41/14* (2006.01)
*F02D 41/24* (2006.01)

(52) U.S. Cl.
CPC ..... *F02D 41/1402* (2013.01); *F02D 41/1406* (2013.01); *F02D 41/1448* (2013.01);
(Continued)

(58) Field of Classification Search
CPC ............. F02D 41/1402; F02D 41/1406; F02D 41/1448; F02D 41/2477
See application file for complete search history.

(56) References Cited

U.S. PATENT DOCUMENTS 6,216,083 B1 4/2001 Ulyanov et al.
8,762,307 B2 6/2014 Hashimoto et al.
(Continued)

FOREIGN PATENT DOCUMENTS

DE 102004026582 A1 12/2005
DE 102009027517 A1 1/2011
(Continued)

OTHER PUBLICATIONS

U.S. Appl. No. 18/252,104, filed May 8, 2023.
(Continued)

*Primary Examiner* — John Kwon
(74) *Attorney, Agent, or Firm* — Leydig, Voit & Mayer, Ltd

(57) ABSTRACT

The invention relates to a motor controller for an internal combustion engine of a vehicle, comprising a control unit for setting one or more control variables on the basis of one or more measured variables according to a stored control scheme; wherein the control unit is designed to modify the stored control scheme when the control unit is used as intended with the operational internal combustion engine, which is being controlled by the motor controller, according
(Continued)

to a specified learning algorithm, namely using at least one feedback parameter which is associated with an optimization criterion and is provided to the control unit, in order to provide an improved control of the internal combustion engine.

15 Claims, 1 Drawing Sheet

(52) U.S. Cl.
CPC .. *F02D 41/2477* (2013.01); *F02D 2041/1437* (2013.01); *F02D 2200/021* (2013.01); *F02D 2200/024* (2013.01); *F02D 2200/0404* (2013.01); *F02D 2200/0614* (2013.01); *F02D 2200/1002* (2013.01); *F02D 2200/101* (2013.01)

(56) References Cited

U.S. PATENT DOCUMENTS

| | | | | |
|---|---|---|---|---|
| 9,803,576 | B2 | 10/2017 | Commenda et al. | |
| 2004/0133336 | A1 | 7/2004 | Fosseen | |
| 2009/0306866 | A1 | 12/2009 | Malikopoulos | |
| 2011/0106399 | A1 | 5/2011 | Asano et al. | |
| 2012/0117011 | A1 | 5/2012 | Hashimoto et al. | |
| 2015/0094939 | A1 | 4/2015 | D'Amato et al. | |
| 2016/0025028 | A1 | 1/2016 | Vaughan | |
| 2017/0234251 | A1 | 8/2017 | Commenda et al. | |
| 2020/0063676 | A1 | 2/2020 | Neema et al. | |
| 2020/0116094 | A1 | 4/2020 | Ge et al. | |
| 2023/0399993 | A1 * | 12/2023 | Beyerer | F02D 41/266 |
| 2024/0003308 | A1 * | 1/2024 | Pfrommer | F02D 41/2451 |

FOREIGN PATENT DOCUMENTS

| | | | |
|---|---|---|---|
| DE | 102011085898 | A1 | 5/2012 |
| DE | 202014002252 | U1 | 7/2015 |
| DE | 102017201632 | A1 | 8/2017 |
| DE | 102017122127 | A1 | 11/2017 |

OTHER PUBLICATIONS

Hu et al., "Energy Management Strategy for a Hybrid Electric Vehicle Based on Deep Reinforcement Learning," *Applied Sciences 8(2):* 187 (2018) 15 pgs.
German Patent Office, Examination Report in German Patent Application No. 10 2020 129 873.0 (Apr. 26, 2021).
European Patent Office, International Search Report in International Application No. PCT/EP2021/081083 (Feb. 18, 2022).
European Patent Office, Written Opinion in International Application No. PCT/EP2021/081083 (Feb. 18, 2022).
International Bureau of WIPO, International Preliminary Report on Patentability in International Application No. PCT/EP2021/081083 (May 16, 2023).
Jankov, K, "Contribution to the automated control map application for vehicle diesel engines," Ph.D. Thesis, Technische Universität Berlin, 2008 (181 pgs.) https://d-nb.info/990507513/34.
European Patent Office, Communication under Article 94(3) EPC in European Patent Application No. 21 810 945.2 (Nov. 28, 2024).

* cited by examiner

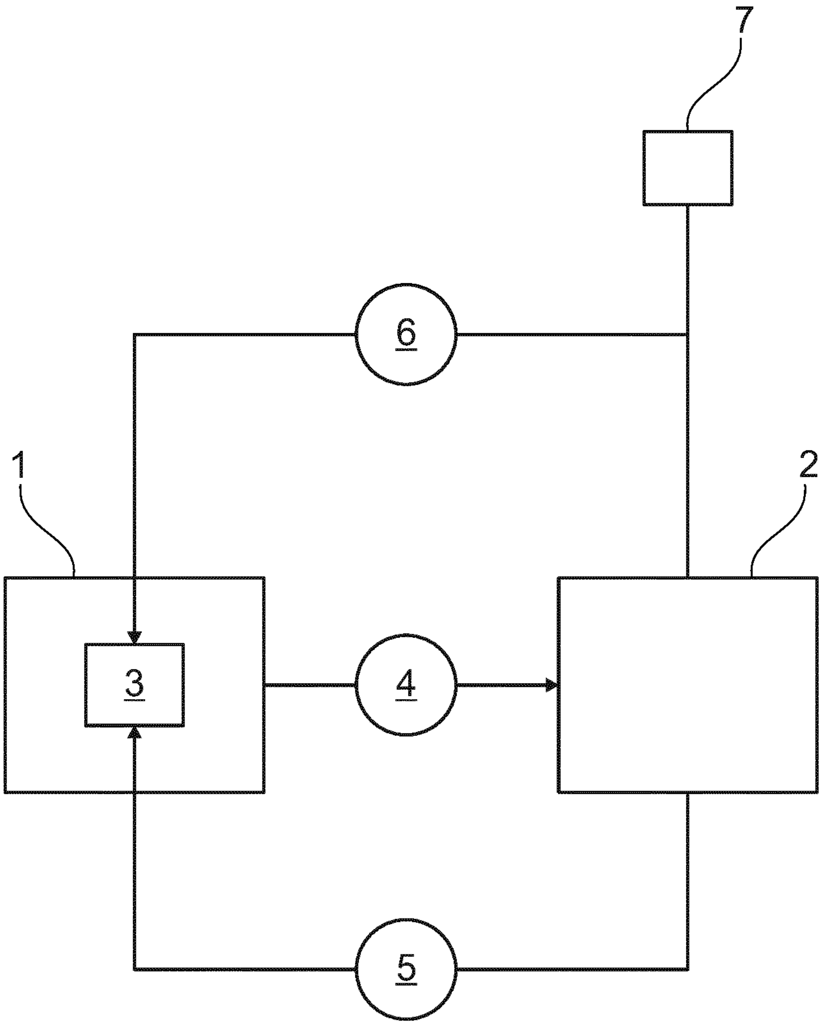
7
6
1
2
3
4
5

CONTROLLER WITH A LEARNING CAPABILITY AND AUTOMATIC EXPLORATION FUNCTION OF AN OPERATING PARAMETER SPACE

CROSS-REFERENCE TO RELATED APPLICATIONS

This patent application is the U.S. national phase of International Application No. PCT/EP2021/081083, filed on Nov. 9, 2021, which claims the benefit of German Patent Application No. 10 2020 129 873.0, filed Nov. 12, 2020, the disclosures of which are incorporated herein by reference in their entireties for all purposes.

The invention relates to an engine controller for an internal combustion engine of a vehicle, which a control unit for setting one or more controlled variables based on one or more measured variables according to a stored control scheme.

Modern engine controllers in (drive) internal combustion engines of vehicles control by open-loop or closed-loop control the internal combustion engine based on a control scheme. This control scheme, which can be present, for example, in the form of a high-dimensional characteristic map for the engine operating parameters (or, generally speaking, including such an operating parameter characteristic map), corresponds to a mathematical mapping of a number of measured variables, which can also be referred to as input engine operating parameters, to a number of controlled variables, which can also be referred to as output engine operating parameters.

The controlled variables are typically output by the corresponding control unit of the engine controller as a voltage, wherein both the level of the corresponding voltage and the point in time of application, this being the "timing," of the corresponding voltage determine the corresponding controlled variable. For example, the magnitude of the corresponding voltage for a throttle valve position, serving as an output engine operating parameter, can code a respective throttle valve angle. The ignition timing, serving as an output engine operating parameter, in contrast, is usually set by way of the timing of the corresponding voltage, that is, the precise point in time of a corresponding voltage peak in the associated control channel, wherein the point in time can be predefined as a relative point in time based on an operating cycle of the internal combustion engine, for example based on top dead center. The input engine operating parameters can be present both as (analog) voltages and as a coded digital signal ("signal sequence" or "command"), for example as a data signal of corresponding sensors or as a data signal that contains values from an appropriate processing unit calculated based on corresponding sensor values. The control scheme, for example in the form of a multidimensional operating parameter characteristic map, then maps a higher-dimensional measured variable space of, for example, nine dimensions to a lower-dimensional controlled variable space of, for example, three dimensions.

The ideal control scheme for an internal combustion engine here, in general, also depends on factors that have not been or are not explicitly taken into consideration in the control scheme. For example, a fuel quality, an air pressure, a humidity, an ambient temperature or other environment parameters, which can vary during the operation of the internal combustion engine and are often not predictable when designing the engine controller, or wear, also changes a behavior of the internal combustion engine. In practice, a universal control scheme is accordingly stored in the engine controller, which supplies stable acceptable results, for example with respect to a torque response, a fuel consumption or an exhaust gas composition of the internal combustion engine, for different environment parameters, that is, varying, different values of one or more environment parameters. A torque response here describes the profile of a provided actual torque of the internal combustion engine in response to a requested target torque.

A first prerequisite for achieving enhanced engine control for internal combustion engines under real conditions is described in US 2004/133 336 A1, in which a combustion performance of a vehicle is remotely identified so as to enable remote monitoring of the vehicle performance.

Accordingly, it is an object of the present invention to provide enhanced control for an internal combustion engine, which makes it possible to better take real environment conditions, and in particular changing environmental conditions, of the internal combustion engine into consideration in the control thereof.

This object is achieved by the subject matter of the present invention and disclosed herein. Advantageous embodiments also disclosed herein.

One aspect relates to an engine controller for an internal combustion engine of a vehicle, comprising a control unit for setting one or more controlled variables based on one or more measured variables according to a stored control scheme. The control scheme can be present, for example, in the form of an (operating parameter) characteristic map or encompass the same. The control unit thus controls the internal combustion engine by means of the controlled variables. The controlled variable or variables can in particular encompass or be a throttle valve position and/or an injected volume and/or an ignition timing and/or a valve opening and valve closing time and/or a turbocharger charging pressure. The at least one measured variable encompasses or is preferably an engine speed and/or a throttle valve position and/or an injected volume and/or a combustion residual gas quantity and/or an ignition timing and/or a valve opening and valve closing time and/or an engine temperature and/or an intake-side gas mixture pressure and/or a pressure in the combustion chamber and/or an exhaust gas-side gas mixture pressure and/or an engine torque and/or an engine mileage. The setting can encompass a closed-loop control and/or an open-loop control.

The control unit is designed to vary the stored control scheme during the intended use with the operating internal combustion engine controlled by the engine controller according to a predefined learning algorithm. This varying, which, since this takes place according to the learning algorithm, can also be referred to as learning, takes place based on at least one feedback parameter that is provided to the control unit and associated with a respective optimization criterion. The control unit, and thus the stored control scheme, is thus modified or varied by means of the feedback parameter, which is assessed by way of the optimization criterion or criteria, during ongoing operation of the internal combustion engine, that is, for example, while the vehicle is driving. For example, in this way it is possible to learn a setting for the internal combustion engine which minimizes specific harmful substance emissions under real conditions when the feedback parameter encompasses an exhaust gas composition, and the optimization criterion rewards a reduction of the aforementioned harmful substance.

This has the advantage that it is possible for the control scheme that is used for setting the internal combustion engine to take into consideration, in a flexible and dynamic manner, changing conditions that influence the behavior of the internal combustion engine. In the process, no controlling outside influence, using open-loop or closed-loop control, is required since the controlled variable space can be independently explored by the learning controller. The engine controller can also take a very specific user behavior into consideration, as well as corresponding specific constants in the real environment of the internal combustion engine, or changes in these constants, so that also less expenditure is required at the factory when it comes to weighing the different usage scenarios for the internal combustion engines, and thus for the particular engine controller. Enhanced control for an internal combustion engine under real environmental conditions is achieved.

In a particularly advantageous embodiment, the learning algorithm encompasses a, preferably model-free, algorithm for "reinforcement learning." During reinforcement learning, the control unit independently learns, varies, and thus optimizes based on the feedback parameter so as to maximize certain rewards received by way of the particular optimization criterion. In the case of such a learning algorithm, continuous gradual weighing also takes place implicitly during the running time, that is, during ongoing operation of the internal combustion engine, and thus during the learning process, between exploitation, that is, the selection of the best known strategy, in the present example the setting according to an unmodified part of the stored control scheme, and exploration, that is, the gathering of new findings, in the present example the varying of the stored control scheme. The control scheme is thus consistently adapted to the respective current environment conditions, representatively for the control strategy known in general from the reinforcement learning. As a result, the engine controller can also be adapted particularly effectively to a changing environment, and better control of the internal combustion engine can be achieved, also under real conditions. The control unit can accordingly be designed to deliberately adapt or vary one or more of the controlled variables so as to generate random samples having a higher informational content for the learning process. Boundaries are predefined for the deliberate adaptation or variation of the controlled variable(s), for example in the form of the prohibited value ranges to be described hereafter. With this, the operating safety can be ensured.

In an advantageous embodiment, it is provided that the at least one feedback parameter encompasses or is a torque of the internal combustion engine and/or a fuel consumption of the internal combustion engine and/or an exhaust gas composition of the internal combustion engine and/or one or more of the measured variables. It is particularly advantageous when the feedback parameter encompasses the pressure in the combustion chamber, and preferably the pressure in each cylinder of the internal combustion engine, as a measured variable. The combustion stroke that is present in each case can be inferred based on the pressure measurements from the cylinders, and the combustion process can thus be optimized. This is particularly advantageous in combination with the continuous provision of the feedback parameter described hereafter. For the provision of the feedback parameter, the engine controller can comprise a corresponding sensor unit or a corresponding sensor data interface unit. The aforementioned parameters have proven to be particularly useful here as feedback parameters for enhancing the control of the internal combustion engine and the real conditions.

In a further advantageous embodiment, it is provided that the optimization criterion for each feedback parameter encompasses a respective target value or a respective trend specification. This can be selected depending on the nature of the feedback parameter, for example a corresponding torque demand of a user can be predefined as a target value for a torque that serves as the feedback parameter, while, for example, a trend specification that rewards a fuel consumption that is as low as possible can generally be predefined for a fuel consumption. In particular, a respective weighting factor and/or a respective prioritization over one or more other feedback parameters can be predefined in the optimization criterion for each feedback parameter. In this way, the control scheme to be learned can be adapted particularly precisely to an ideal pattern. It is also possible, for example by way of different weighting factors or prioritizations, to adapt the learning to different driving modes of the vehicle: in a sports mode, for example, a weighting factor of the fuel consumption, serving as a feedback parameter, or a respective prioritization of the fuel consumption in relation to the torque can be reset, while exactly the opposite can be selected, for example, in an eco mode. Generally, it is possible to implement arbitrary hierarchical structures of the optimization criteria in the learning process using weighting factors and/or prioritizations. This also contributes to better control of the internal combustion engine in different settings.

In a particularly advantageous embodiment, it is provided that the control unit is designed to ensure that the at least one feedback parameter is provided continuously (repeatedly, for an undetermined number of times, at the respective current value thereof) during the operation of the internal combustion engine, as well as for a corresponding continuous variation of the control scheme, as long as the variation is useful according to the optimization criterion, that is, can take place in concordance with the optimization criterion. In particular, it can be provided here that the feedback parameter is provided once per ignition or ignition process or ignition cycle (operating cycle) of the internal combustion engine. The control unit is preferably designed to vary the control scheme once in response to each provision of the at least one feedback parameter, as long as the variation is useful according to the optimization criterion. In this way, the control unit learns in the fastest possible way since each variation or confirmation of the feedback parameter, which takes place with the provision of the feedback parameter, entails a learning step. Accordingly, a frequent, continuous provision, ideally occurring for each combustion process, of the feedback parameter or parameters is ideal for rapid learning, and thus for a rapid adaptation of the engine controller to the environment conditions.

In a particularly advantageous embodiment, it is provided that the control unit is a pretrained control unit, in which the stored control scheme was already varied prior to the intended use with a real internal combustion engine in a motor vehicle according to the predefined learning algorithm, or also another learning algorithm within the scope of a simulation, which thus corresponds to a pretraining. The variation has then taken place based on at least one simulated feedback parameter, which was provided to the control unit and associated with the optimization criterion, in conjunction with one or more simulated measured variables. The corresponding internal combustion engine simulation then, during the pretraining of the control unit, calculates from the controlled variables, provided by the control unit of the engine controller, the simulated feedback parameter or parameters as well as the corresponding simulated measured variable or variables, which is or are then provided to the engine controller again. This has the advantage that the learning algorithm is already calibrated prior to use with a real internal combustion engine, so that the adaptation to the real environment conditions in fact only equates to a fine adjustment. In this way, it can be prevented that the control unit possibly attempts to set the real internal combustion engine using controlled variables that are damaging to the engine or hazardous to the user of the internal combustion engine. Additionally, the learning period of the control unit during operation is thus also shortened, which, in turn, enhances the control of the internal combustion engine in a changing environment.

In another advantageous embodiment, it is provided that respective prohibited value ranges are predefined for the controlled variable or variables in the control unit, and in particular in the learning algorithm, so that values from the prohibited value ranges cannot be set and/or cannot be learned. This has the advantage of increased operating safety and expedited learning since damaging or hazardous controlled variables can be precluded from the outset, and in this way suitable controlled variables can also be found more easily by the learning algorithm.

A further aspect also relates to an internal combustion engine or to a vehicle comprising an engine controller according to one of the described embodiments.

Finally, one aspect also relates to a method for operating an engine controller for an internal combustion engine of a vehicle, which comprises a control unit for setting one or more controlled variables based on one or more measured variables according to a stored control scheme. One method step here is that of varying the stored control scheme according to a predefined learning algorithm during the intended use of the engine controller with the operating internal combustion engine, and more particularly based on at least one feedback parameter that is provided to the control unit and associated with an optimization criterion.

Advantages and advantageous embodiments of the method here correspond to advantages and advantageous embodiments of the engine controller.

The features and feature combinations provided above in the description, including in the introductory part, and the features and feature combinations provided hereafter in the description of the FIGURE and/or shown only in the FIGURE, can be used not only in the respective indicated combination, but also in other combinations, without departing from the scope of the invention. As a result, embodiments that are not explicitly shown and described in the FIGURE, but that, as a result of separate feature combinations, can be derived from and implemented based on the described embodiments, shall also be considered to be encompassed and disclosed by the invention. Embodiments and feature combinations that thus do not include all the features expressly disclosed anywhere in the application.

The subject matter according to the invention shall be described in more detail based on the schematic drawings shown in the following FIGURE, without limiting the subject matter to the specific embodiments shown here.

The FIGURE shows a schematic illustration of an exemplary embodiment of a learning engine controller including independent exploration of an operating parameter space. The engine controller 1 is coupled to an internal combustion engine 2 of a vehicle, which is not shown. The engine controller 1 comprises a control unit 3 for setting one or more controlled variables 4 based on one or more measured variables 5 according to a stored control scheme. The control unit 3 is designed to vary the stored control scheme according to a predefined learning algorithm during the intended use with the operating internal combustion engine 2, in the present case operating in the vehicle, and controlled by the engine controller 1, and more particularly based on at least one feedback parameter 6 that is provided to the control unit 3 and associated with an optimization criterion. As in the shown example, the feedback parameter can be fed back by the internal combustion engine 2, and alternatively or additionally by a further unit, such as a sensor unit 7, for example.

Since the feedback parameter or parameters 6 in the present example is or are collected continuously, that is repeatedly, for an undetermined number of times, in particular once per ignition of the internal combustion engine, and provided to the control unit 3, the learning engine controller 1 is able to adapt quickly and independently to changing environment conditions, such as, for example, a changing humidity or a changing air pressure, and can thus enhance the control of the internal combustion engine 2 in keeping with the optimization criterion.

The invention claimed is:

1. An engine controller for an internal combustion engine of a vehicle, comprising a control unit for setting one or more controlled variables based on one or more measured variables according to a stored control scheme, wherein the control unit is configured to vary the stored control scheme according to a predefined learning algorithm during the intended use with the operating internal combustion engine controlled by the engine controller, wherein the predefined learning algorithm is based on at least one feedback parameter that is provided to the control unit and associated with an optimization criterion, and wherein the at least one feedback parameter is a pressure or encompasses a pressure in the combustion chamber or an exhaust gas-side gas mixture pressure.

2. The engine controller according to claim 1, wherein the at least one measured variable encompasses an engine speed, a throttle valve position, an injected fuel volume, a combustion residual gas quantity, an ignition timing, a valve opening and valve closing time, an engine temperature, an intake-side gas mixture pressure, a pressure in the combustion chamber, an exhaust gas-side gas mixture pressure, an engine torque, or an engine mileage, and/or the at least one controlled variable encompasses a throttle valve position, an injected fuel volume, an ignition timing, or a valve opening and closing time.

3. The engine controller according to claim 1, wherein the predefined learning algorithm is an algorithm for reinforcement learning or encompasses such an algorithm.

4. The engine controller according to claim 3, wherein the control unit is configured to deliberately adapt one or more of the controlled variables so as to generate random samples having a higher informational content for the learning process.

5. The engine controller according to claim 1, wherein the at least one feedback parameter encompasses a torque of the internal combustion engine, a fuel consumption of the internal combustion engine, or an exhaust gas composition of the internal combustion engine.

6. The engine controller according to claim 1, wherein the optimization criterion encompasses a respective target value or a respective trend specification for each feedback parameter.

7. The engine controller according to claim 6, wherein the optimization criterion encompasses also a respective weighting factor and/or a respective prioritization over one or more other feedback parameters.

8. The engine controller according to claim 1, wherein the control unit is configured to ensure that the at least one feedback parameter is provided continuously.

9. The engine controller according to claim 8, wherein the at least one feedback parameter is provided continuously once per ignition of the internal combustion engine during the operation of the internal combustion engine, and is configured to continuously vary the control scheme.

10. The engine controller according to claim 9, wherein the at least one feedback parameter is provided to vary the control scheme once in response to each provision of the at least one feedback parameter as long as the variation is useful according to the optimization criterion.

11. The engine controller according to claim 1, wherein the control unit is a pretrained control unit in which the stored control scheme is varied according to the predefined learning algorithm prior to the intended use with the operating internal combustion engine within the scope of a simulation.

12. The engine controller according to claim 11, wherein the predefined algorithm is based on at least one feedback parameter that is provided to the control unit and associated with the optimization criterion, in conjunction with one or more simulated measured variables.

13. The engine controller according to claim 1, wherein the respective prohibited value ranges are predefined for the controlled variable or controlled variables in the control unit so that values from the prohibited value ranges cannot be set.

14. An internal combustion engine or a vehicle, comprising an engine controller according to claim 11.

15. A method for operating an engine controller for an internal combustion engine of a vehicle comprising a control unit for setting one or more controlled variables based on one or more measured variables according to a stored control scheme, the method comprising varying the stored control scheme according to a predefined learning algorithm during the intended use of the engine controller with the operating internal combustion engine, wherein the predefined learning algorithm is based on at least one feedback parameter that is provided to the control unit and associated with an optimization criterion, and wherein the at least one feedback parameter is a pressure or encompasses a pressure in the combustion chamber or an exhaust gas-side gas mixture pressure.

* * * * *